US012454209B2

(12) United States Patent
Holder et al.

(10) Patent No.: US 12,454,209 B2
(45) Date of Patent: Oct. 28, 2025

(54) TRUCK CARRIED FORKLIFT MOUNTING SYSTEM

(71) Applicant: Hol-Mac Corporation, Bay Springs, MS (US)

(72) Inventors: Rory Holder, Bay Springs, MS (US); Brian Gorner, Lakewood, CO (US)

(73) Assignee: Hol-Mac Corporation, Bay Springs, MS (US)

( * ) Notice: Subject to any disclaimer, the term of this patent is extended or adjusted under 35 U.S.C. 154(b) by 369 days.

(21) Appl. No.: 17/930,230

(22) Filed: Sep. 7, 2022

(65) Prior Publication Data

US 2023/0098903 A1    Mar. 30, 2023

Related U.S. Application Data

(63) Continuation of application No. 17/732,936, filed on Apr. 29, 2022, now abandoned.

(60) Provisional application No. 63/181,511, filed on Apr. 29, 2021.

(51) Int. Cl.
*B66F 9/075* (2006.01)
*B60P 3/073* (2006.01)

(52) U.S. Cl.
CPC .......... *B60P 3/073* (2013.01); *B66F 9/07563* (2013.01)

(58) Field of Classification Search
CPC ... B66F 9/07563; B66F 9/07581; B60P 3/073
See application file for complete search history.

(56) References Cited

U.S. PATENT DOCUMENTS

| 3,799,379 | A | * | 3/1974 | Grether | B66F 9/07563 187/229 |
| 5,575,604 | A | * | 11/1996 | Dubosh | B66F 9/07563 414/467 |
| 5,749,695 | A | * | 5/1998 | Moffett | B66F 9/07563 414/467 |
| 5,813,821 | A | * | 9/1998 | Braud | B66F 9/0655 414/667 |
| 6,062,800 | A | * | 5/2000 | Perry | B66F 9/07563 414/467 |
| 6,530,739 | B1 | * | 3/2003 | Fridman | B66F 9/07563 414/467 |
| 6,572,322 | B2 | * | 6/2003 | Karr | B60P 3/055 414/467 |
| 7,927,063 | B2 | * | 4/2011 | Keenan | B66F 9/24 414/812 |
| 2008/0292437 | A1 | * | 11/2008 | Keenan | B66F 9/07581 414/467 |
| 2011/0052354 | A1 | * | 3/2011 | McGrane | B66F 9/07563 414/373 |

(Continued)

FOREIGN PATENT DOCUMENTS

IE    0885837 A2 * 12/1998 ............ B66F 9/075

*Primary Examiner* — Kaitlin S Joerger
(74) *Attorney, Agent, or Firm* — Jones Walker LLP

(57) ABSTRACT

A forklift mounting system for a truck or trailer is provided. The forklift mounting system includes a plurality of receiving channels connected to the chassis of the truck or trailer, and a saddle mount assembly comprising: (1) a means for connecting the saddle mount assembly to the plurality of receiving channels, and (2) a means for connecting a forklift to the saddle mount assembly. The forklift connecting means includes an auto lock mechanism for securing the lower mast tube to the saddle mount assembly.

20 Claims, 9 Drawing Sheets

(56) References Cited

U.S. PATENT DOCUMENTS

2011/0058921 A1\* 3/2011 McGrane ............ B66F 9/07563
  414/373
2017/0283227 A1\* 10/2017 Turnbull ............. F15B 13/0402

\* cited by examiner

TRUCK CARRIED FORKLIFT MOUNTING SYSTEM

CROSS-REFERENCE TO RELATED APPLICATION

This application is a continuation application U.S. application Ser. No. 17/732,936, filed Apr. 29, 2022, which claims the benefit of U.S. Prov. App. No. 63/181,511, filed Apr. 29, 2021, both of which are incorporated by reference herein in their entireties.

SUMMARY OF THE INVENTION

The present invention relates generally to method and system for mounting a forklift to the chassis of a truck or trailer.

In a first embodiment of the present invention, a forklift mounting system for a truck or trailer is provided, comprising a plurality of receiving channels connected to the chassis of the truck or trailer, and a saddle mount assembly comprising: (1) a means for connecting the saddle mount assembly to the plurality of receiving channels, and (2) a means for connecting a forklift to the saddle mount assembly. The forklift connecting means includes one or more auto lock mechanisms for securing the forklift to the saddle mount assembly, wherein each auto lock mechanism comprises a cavity, and wherein each cavity is paired with a rotatable locking member. The forklift includes a lower mast structure having a lower mast tube which fits within the plurality of cavities and is secured by the plurality of rotatable locking members. The saddle mount connecting means includes a plurality of mounting bars designed to pair within the plurality of receiving channels, and a plurality of retaining pins for securing each mounting bar within a corresponding receiving channel.

In a first embodiment of the present invention, a method of mounting a forklift to the chassis of a truck or trailer is provided. The method includes providing a saddle mount assembly that removably connects to the chassis, connecting the saddle mount assembly to the chassis, and mounting the forklift to the saddle mount assembly. The method also includes providing a means for receiving the saddle mount assembly connected to the chassis.

BACKGROUND

A piece of equipment that is both critical and commonplace in a variety of industrial applications is a truck-mounted forklift. The unit is typically a truck that has an open, payload-carrying bed and a forklift attached to the back. The forklift is traditionally secured with hooks, chains, or latches that keep the forklift from shifting when the truck is in motion.

A truck-mounted forklift unit carries material to a job site or a warehouse. Upon arrival, the forklift is detached and deployed, independently of the host truck, to load, unload, and move material on site. As such, truck-mounted forklift units play a pivotal role in industrial applications, providing a practical, 2-in-1 solution to hauling and loading/unloading.

Any industry that needs material to be transported and offloaded has a use for a truck-mounted forklift, which merges the functions of a lifting tool and a vehicle. Some of these industries include construction, recycling, warehouses and distribution centers, gas/LPG containers, agriculture, and dockyards—all of which often require maneuverability in confined and/or congested spaces.

The system and method of the present invention is designed to be used with all truck chassis, such as Freightliner, Peterbilt, and International. The system and method of the present invention is designed to be used with a wide variety of truck-mounted forklifts, but is especially suitable for use with Donkey forklifts. https://donkeyforklift.com/.

BRIEF DESCRIPTION OF THE FIGURES

The features and advantages of the present invention will be more clearly understood from the following description taken in conjunction with the accompanying drawings as described below.

DESCRIPTION OF THE INVENTION

The present invention provides a new and improved design for an adjustable truck carried forklift mounting system, and a novel method for securely mounting and removing a forklift to a truck.

Figure 1:
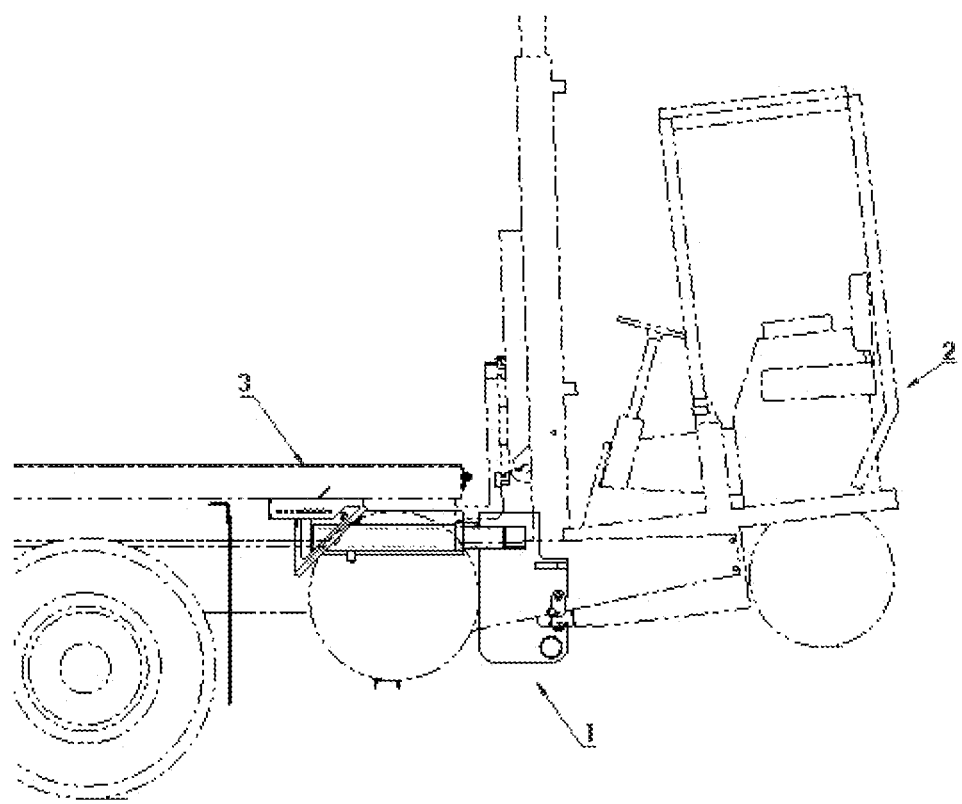
FIG. 1 illustrates a side view of a forklift mounted to the rear of a truck using the forklift mounting system of the present invention.

In a first embodiment of the present invention, forklift mounting system is provided for easy transport of a forklift to and from a job site to assist in the delivery of materials. As shown in FIG. 1, the forklift mounting system 1 positions the forklift 2 (shown in phantom line) so that the entire deck 3 is available for payload (not shown). By attaching the forklift mounting system 1 to structural members of the truck/trailer, details described below, the forklift mounting system 1 can be made very light weight, providing more payload capacity for the truck/trailer. Further, because existing purpose-built structural members are utilized for forklift mounting system 1, minimal modifications to the truck/trailer are required for installation. As described below, forklift mounting system 1 features a modular design that adjustable to fit a variety of trucks, trailers and forklifts, creating a single solution for a multitude of applications. The auto lock feature forklift mounting system 1, described below, safely retains the forklift in the mounted position without further operator interaction. An additional benefit of the present invention is its improved versatility, with strategic portions of forklift mounting system 1 that are quickly removable to provide swapping between transport vehicles, dock loading, pulling pup trailers, or utilizing dump bodies.

Figure 2:
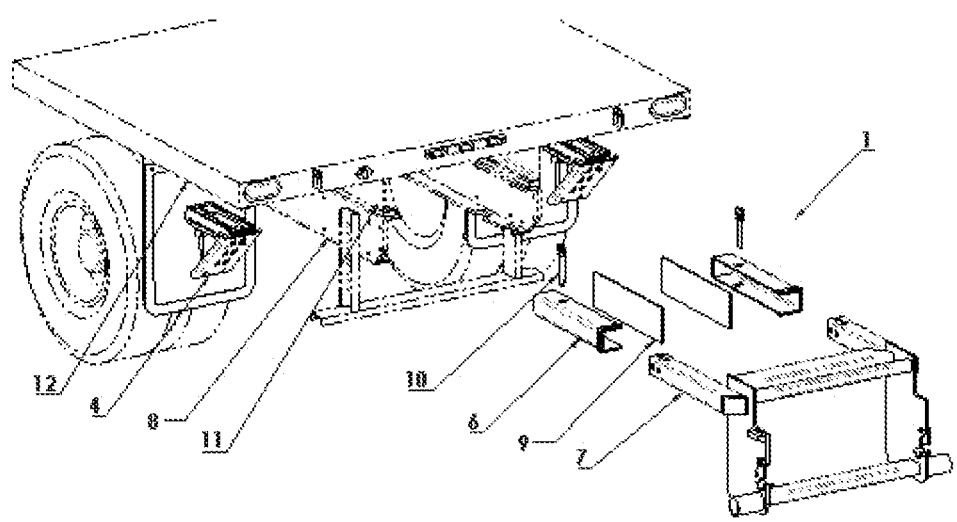
FIG. 2 illustrates an exploded view of the forklift mounting system of the present invention.

With reference to FIG. 2, an exploded view of forklift mounting system 1 of the present invention is shown. Adapter plates 9 are preferably attached to the structural channels of the truck/trailer chassis 8, or alternatively to deck 11, using techniques well known in the art such as Arc or MIG welding. Persons of ordinary skill in the art will appreciate that adapter plates 9 can be adjusted for optimal fit to the truck/trailer/deck regardless of their size, shape, style, or contour. Receiver channels 6 attach to adapter plates 9 as shown in FIG. 2, using techniques well known in the art such as Arc or MIG welding, the adapter plates 9 providing a solid attachment surface for receiver channels 6. Saddle mount 7 is designed to slide into, and therefore be slidably engaged with, receiver channels 6, and is preferably secured with retaining pins 10.

Figure 5:
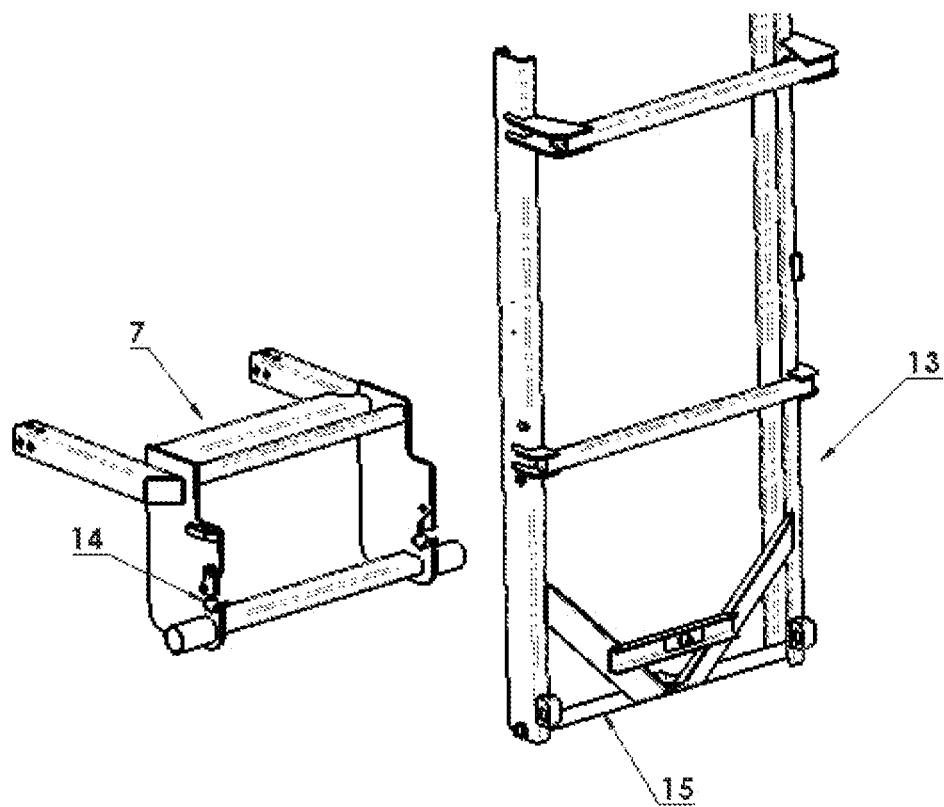
FIG. 5 illustrates the lower mast structure of the forklift disengaged from the saddle of the forklift mounting system of the present invention.

As is readily apparent, in a preferred embodiment of the present invention, forklift mounting system 1 attaches to existing structural members of the truck/trailer, making extensive modifications to the transport vehicle unnecessary. Receiver channels 6 attach directly to the adapter plates 9, as depicted in FIG. 2. These channels are intended to carry the heavy loads transported by the vehicle. This is significantly different than other mounting kits sold in the industry today, which attach to non-structural members and require significant modifications to the members to make them suitable for installation of said mounting kits. The forklift mounting system 1 of the present invention also provides a light weight design. With reference to FIG. 2, saddle mount 7 inserts into the receiver channels 6 and is secured in place by removable retaining pins 10. As depicted in FIG. 5, the lower mast structure 13 (specifically lower mast tube 15) of forklift 2 rides in saddles 14 of saddle mount 7. As such, a person having ordinary skill in the art will appreciate that saddles 14 carry the majority of forklift 2's weight. As such, the present invention takes advantage of the truck/trailer's existing structural members, resulting in weight savings for forklift mounting system 1 that can be fully replaced by valuable payload for the operator.

Figure 3:
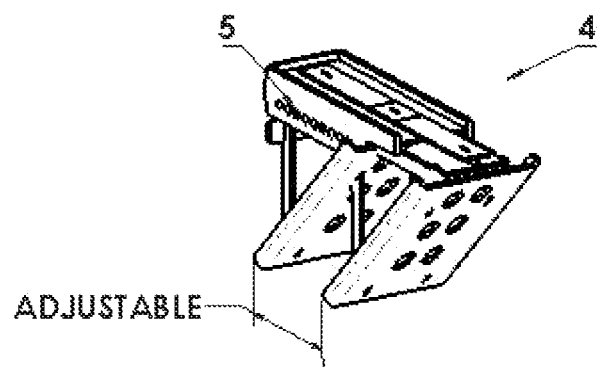
FIG. 3 illustrates an adjustable tire rest used with the forklift mounting system of the present invention.
Figure 4:
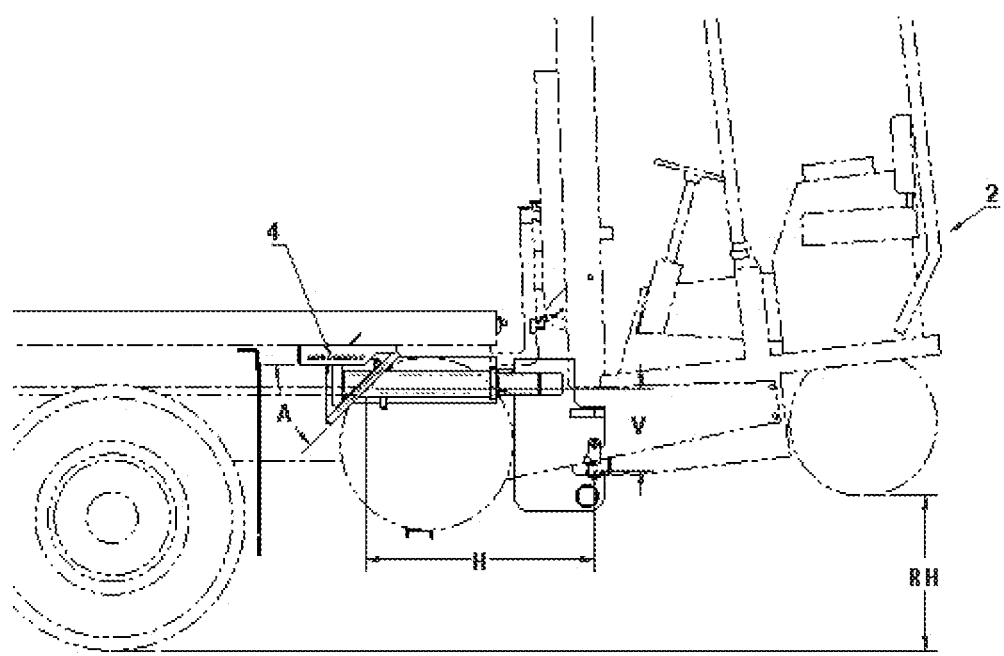
FIG. 4 illustrates the adjustable tire rest of FIG. 3 mounted to the rear of a truck to set the horizontal vertical fit to the forklift, in accordance with certain teachings of the present invention.

Still with reference to FIG. 2, tire rests 4 attach to the underside of deck 12, and are preferably designed to accommodate different style decks. Altering the dimensional relationship between tire rests 4 and saddles 14 (shown in FIG. 5) allows various model forklifts to be carried with only minor adjustments using the forklift mounting system 1 of the present invention. Minor alterations are accomplished using tire rest adjustment holes 5, as shown in FIG. 3. As shown in FIG. 4, this fore/aft adjustment combined with the angle of the tire rests 4 (the angle represented by A in FIG. 4), sets the horizontal H and vertical V fit to the forklift. A person having ordinary skill in the art will appreciate that proper setting of these dimensions places the rear tire of forklift 2 at the correct ride height, denoted as RH in FIG. 4.

Figure 6:
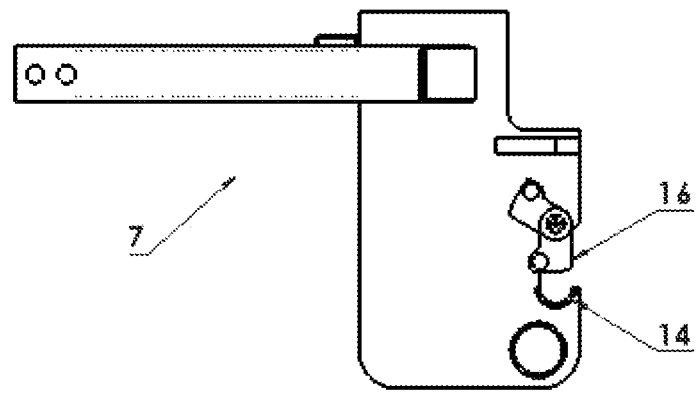
FIG. 6 illustrates the auto lock system of the saddle, in accordance with certain teachings of the present invention.
Figures 7A, 7B, 7C:
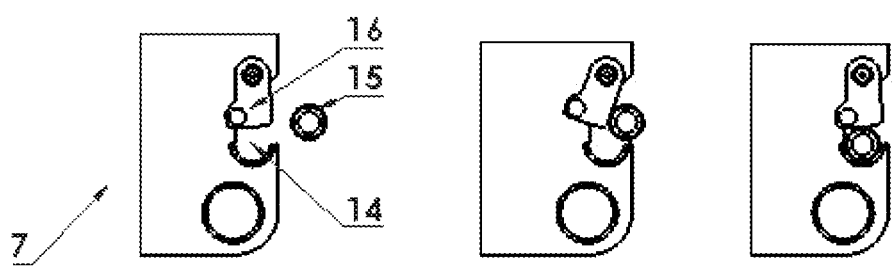
FIGS. 7A-7C illustrates a side view of the auto lock system of FIG. 6, and depicts the sequence of loading the lower mast tube of the forklift into the auto lock system, in accordance with certain teachings of the present invention.

In a preferred embodiment of the present invention, with reference to FIGS. 6-8, saddle mount 7 incorporates an auto lock system that secures forklift 2 (FIG. 4) once lower mast tube 15 (FIG. 5) of lower mast structure 13 (FIG. 5) of forklift 2 (FIG. 4) is seated in saddles 14 (FIG. 5). With reference to FIGS. 7A-C, when lower tube 15 of lower mast structure 13 (FIG. 5) enters the cavity of saddles 14, lock 16 is pushed forward to expose access to saddle 14. After the lower mast tube 15 is seated in saddle 14, lock 16 swings back to its original position and "traps" the lower mast tube 15 within saddles 14. As is evident, a person having ordinary skill in the art will appreciate that the present invention significantly reduces operator actions to secure the forklift to a mount for transport.

Figure 8A:
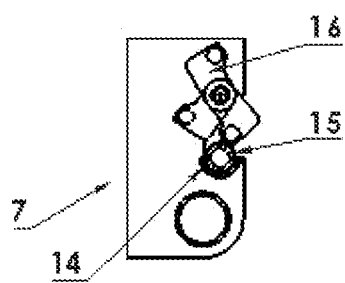
FIGS. 8A-8C illustrates a side view of the auto lock system of FIG. 6, and depicts the sequence of unloading the lower mast tube of the forklift from the auto lock system, in accordance with certain teachings of the present invention.
Figure 8B:
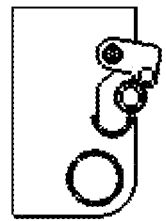
Figure 8C:
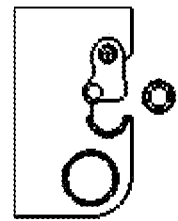

As illustrated in FIGS. 8A-8C, locks 16 are easily released by rotating them around its pivot, resting locks 16 on top of lower mast tube 15. Once the forklift is removed from saddle mount 7, locks 16 return to their ready position as shown FIG. 8C. The unique shape of locks 16 ensures they remain position, properly retaining lower mast tube 15 and therefore forklift 2 (FIG. 4). In a preferred aspect of this embodiment, the bottom edge of locks 16 is strategically shaped so they can swing down to cover lower mast tube 15 but not swing past it. It is also preferred that the center of mass of locks 16 is slightly forward, ensuring lower mast tube 15 remains locked, especially during transport.

Figure 9:
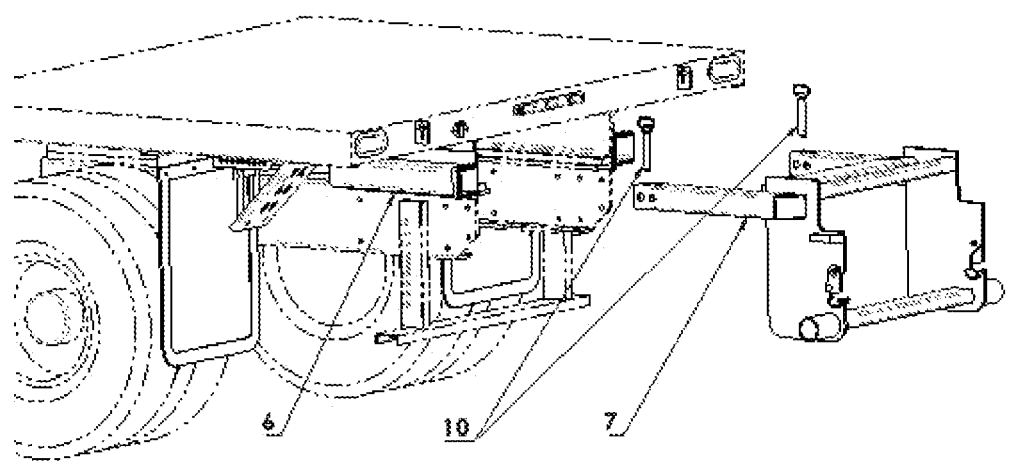
FIG. 9 illustrates the forklift mounting system of the present invention disengaged from the rear of the truck.

With reference to FIG. 9, saddle mount 7 is uniquely designed for easy removal, therefore enabling dock loading, dump bodies, or pulling a trailer. Saddle mount 7 is therefore only needed to be in place for transporting forklift 2 (FIG. 4), and can be quickly removed from the truck/trailer by pulling the retaining pins 10 and sliding it out of receiver channels 6. With saddle mount 7 removed, the truck can, for example, be backed into loading docks or pull a pup trailer. A person having ordinary skill in the art will appreciate that removal of saddle mount 7 is desirable if the truck is fitted with a dump body. For example, while tilting the dump body with a prior art mounting system, the mount can come into contact with the truck/trailer bumper or the ground, or can prevent complete discharge of the materials being dumped. Furthermore, another benefit of the present invention is that fleet owners can utilize fewer forklift mounting systems of the present invention, utilizing the easy removal features of the present invention to swap mounts between transport vehicles within the fleet.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings therein. Furthermore, no limitations are intended to the details of construction or design herein shown, other than as described in the claims below. It is therefore evident that the particular illustrative embodiments disclosed above may be altered or modified and all such variations are considered within the scope and sprit of the present invention.

What is claimed is:

1. A forklift mounting system for a truck or trailer, comprising:
   a plurality of receiving channels connected to the chassis of the truck or trailer;
   a saddle mount assembly comprising: (1) a plurality of mounting bars for connecting the saddle mount assembly within the plurality of receiving channels, and (2) a plurality of auto lock mechanisms disposed below the plurality of mounting bars for connecting a forklift to the saddle mount assembly.

2. The forklift mounting system of claim 1, wherein each of the plurality of auto lock mechanisms comprises a cavity, and wherein each cavity is paired with a rotatable locking member.

3. The forklift mounting assembly of claim 2, wherein each rotatable locking member is configured to rotate from a first closed position to a second open position to expose access to each corresponding cavity of the plurality of auto lock mechanisms upon first engaging with a lower mast tube of the forklift.

4. The forklift mounting assembly of claim 2, wherein each rotatable locking member is configured to rotate from an open position to a closed position to secure a lower mast tube of the forklift to the saddle assembly when the lower mast tube is seated within each corresponding cavity of the plurality of auto lock mechanisms.

5. The forklift mounting assembly of claim 1, wherein the plurality of mounting bars and the plurality of auto lock mechanisms form an integral structure.

6. The forklift mounting system of claim 2, wherein the forklift comprises a lower mast structure comprising a lower mast tube, and wherein the lower mast tube fits within the plurality of cavities and is secured by the plurality of rotatable locking members.

7. The forklift mounting system of claim 1, wherein each of the plurality of mounting bars comprises a plurality of retaining pins for securing each of the plurality of mounting bars within a corresponding receiving channel.

8. A method of mounting a forklift to the chassis of a truck or trailer, comprising:
providing a saddle mount assembly that removably connects to the chassis of a truck or trailer, wherein the saddle mount assembly comprises: (1) a plurality of mounting bars for connecting the saddle mount assembly within a plurality of receiving channels, and (2) a plurality of auto lock mechanisms disposed below the plurality of mounting bars for connecting the forklift to the saddle mount assembly;
connecting the saddle mount assembly to the chassis; and
mounting the forklift to the saddle mount assembly.

9. The method of claim 8, further comprising providing a plurality of receiving channels connected to the chassis and designed to pair within the plurality of receiving channels.

10. The method of claim 9, wherein the connecting step further comprises securing each of the plurality of mounting bars within a corresponding receiving channel with a retaining pin.

11. The method of claim 8, wherein the forklift comprises a lower mast structure comprising a lower mast tube, and wherein the saddle mount assembly comprises one or more auto lock mechanisms; wherein the mounting step further comprises securing the lower mast tube into the one or more auto lock mechanisms.

12. The method of claim 11, wherein each auto lock mechanism comprises a cavity, and wherein each cavity is paired with a rotatable locking member.

13. The method of claim 12, wherein the mounting step further comprises locking the mast tube within each cavity using the rotatable locking member.

14. A forklift mounting system for a truck or trailer, comprising:
a receiving channel connected to the chassis of the truck or trailer;
a saddle mount assembly comprising: (1) a mounting bars for connecting the saddle mount assembly within the receiving channels, and (2) an auto lock mechanism, disposed below the mounting bars, for connecting a forklift to the saddle mount assembly.

15. The forklift mounting system of claim 14, wherein the auto lock mechanism comprises a cavity, and wherein the cavity is paired with a rotatable locking member.

16. The forklift mounting system of claim 15, wherein the forklift comprises a lower mast structure comprising a lower mast tube, and wherein the lower mast tube fits within the cavity and is secured by the rotatable locking member.

17. The forklift mounting system of claim 14, wherein mounting bars comprises a retaining pin for securing the mounting bar within the receiving channel.

18. The forklift mounting system of claim 14, wherein the mounting bars and the auto lock mechanism form an integral structure.

19. The forklift mounting assembly of claim 15, wherein the rotatable locking member is configured to rotate from a first closed position to a second open position to expose access to the cavity of the auto lock mechanism upon first engaging with a lower mast tube of the forklift.

20. The forklift mounting assembly of claim 15, wherein the rotatable locking member is configured to rotate from an open position to a closed position to secure a lower mast tube of the forklift to the saddle assembly when the lower mast tube is seated within the cavity of the auto lock mechanism.

* * * * *